(12) United States Patent
Shu et al.

(10) Patent No.: US 10,700,903 B2
(45) Date of Patent: Jun. 30, 2020

(54) CIRCUIT STRUCTURE FOR EFFICIENTLY DEMODULATING FSK SIGNAL IN WIRELESS CHARGING DEVICE

(71) Applicant: WUXI CHINA RESOURCES SEMICO CO., LTD, Wuxi (CN)

(72) Inventors: Wenli Shu, Wuxi (CN); Congyin Wang, Wuxi (CN); Qiyi Zhao, Wuxi (CN)

(73) Assignee: WUXI CHINA RESOURCES SEMICO CO., LTD., Wuxi (CN)

(*) Notice: Subject to any disclaimer, the term of this patent is extended or adjusted under 35 U.S.C. 154(b) by 0 days.

(21) Appl. No.: 16/337,526

(22) PCT Filed: Jul. 29, 2017

(86) PCT No.: PCT/CN2017/095078
§ 371 (c)(1),
(2) Date: Mar. 28, 2019

(87) PCT Pub. No.: WO2018/082357
PCT Pub. Date: May 11, 2018

(65) Prior Publication Data
US 2019/0253289 A1  Aug. 15, 2019

(30) Foreign Application Priority Data
Nov. 3, 2016  (CN) .......................... 2016 1 0958222

(51) Int. Cl.
*H04L 27/144*  (2006.01)
*H04L 27/156*  (2006.01)
(Continued)

(52) U.S. Cl.
CPC ............ *H04L 27/156* (2013.01); *H02J 7/025* (2013.01); *H04B 5/0037* (2013.01); *H04J 3/047* (2013.01); *H04L 27/148* (2013.01)

(58) Field of Classification Search
CPC ...... H04L 27/156; H04L 27/148; H02J 7/025; H02J 50/00; H02J 50/12; H02J 50/10;
(Continued)

(56) References Cited

U.S. PATENT DOCUMENTS

2013/0225077 A1   8/2013  Schultz et al.
2015/0044966 A1*  2/2015  Shultz .................. H04B 5/0012
                                                                  455/41.1
(Continued)

FOREIGN PATENT DOCUMENTS

CN    106532969 A    3/2017
EP    3537675 A1 *  9/2019

OTHER PUBLICATIONS

International Search Report dated Nov. 3, 2018 for International Application No. PCT/CN2017/095078 filed Jul. 29, 2017.
(Continued)

*Primary Examiner* — Tesfaldet Bocure
(74) *Attorney, Agent, or Firm* — Blue Filament Law PLLC

(57) ABSTRACT

A circuit structure for efficiently demodulating an FSK signal in a wireless charging device, comprising a data sampling module, a period point counting module, a data distribution module, and a period point processing module. An input terminal of the period point counting module is connected to an output terminal of the data sampling module; an input terminal of the data distribution module is connected to an output terminal of the period point counting module; and an input terminal of the period point processing module is connected to an output terminal of the data distribution module.

10 Claims, 6 Drawing Sheets

(51) Int. Cl.
*H04J 3/04* (2006.01)
*H02J 7/02* (2016.01)
*H04B 5/00* (2006.01)
*H04L 27/148* (2006.01)

(58) Field of Classification Search
CPC ........ H02J 50/80; H02J 50/90; H04B 5/0037; H04J 3/047
USPC .................................. 375/272, 329; 329/315
See application file for complete search history.

(56) References Cited

U.S. PATENT DOCUMENTS

| | | | |
|---|---|---|---|
| 2015/0049833 A1 | 2/2015 | Noguchi et al. | |
| 2016/0336785 A1* | 11/2016 | Gao | ........................ H02J 50/80 |
| 2019/0253288 A1* | 8/2019 | Wang | ................... H04B 5/0037 |
| 2019/0393734 A1* | 12/2019 | Zhou | ....................... H02J 7/025 |

OTHER PUBLICATIONS

Supplementary European Search Report dated Mar. 20, 2020, issued in corresponding European Appln. No. EP17867412.

\* cited by examiner

CIRCUIT STRUCTURE FOR EFFICIENTLY DEMODULATING FSK SIGNAL IN WIRELESS CHARGING DEVICE

CROSS-REFERENCE TO RELATED APPLICATIONS

The present application claims priority to Chinese Patent Application No. 201610958222.3, filed on Nov. 3, 2016, the content of which is incorporated herein by reference in its entirety.

TECHNICAL FIELD

The present disclosure relates to the field of wireless charging technologies, and in particular to the field of wireless charging communication technologies, and specifically to a circuit structure for efficiently demodulating an FSK signal in a wireless charging device.

BACKGROUND

A wireless charging device using Qi standard transmits power in a manner of 2FSK (Binary Frequency-Shift Keying), and a signal received by an energy receiving terminal in the wireless charging system is an inductively coupled signal, such that the signal it received is not a single frequency sinusoidal signal, but may be doped with a large amount of high frequency noise. Currently, since the wireless charging technology is in its early stage, there are not many FSK (Frequency-Shift Keying) signal demodulation circuits for the Qi standard wireless charging device. The existing FSK demodulation circuits are all directed at ordinary FSK signals, and the traditional 2FSK demodulation methods are mainly three manners: coherent demodulation, filtering non-coherent demodulation and quadrature multiplication non-coherent demodulation.

In the Qi standard communication protocol, a period difference between a carrier frequency Fop and a modulation frequency Fmod is specified in order to achieve the transmission energy stability, and its maximum value is 282 ns and its minimum value is only 32 ns. If the traditional method is used for demodulation, the entire system needs very high precision to distinguish different frequencies, which will greatly increase the overhead of the entire circuit no matter adopting the analog or the digital method. Meanwhile, the carrier frequency Fop may be an arbitrary value in a range from 110 KHz to 205 KHz in different communication phases of the same system, thereby further greatly increasing the overhead of the entire demodulation circuit.

SUMMARY

An object of the present disclosure is to overcome the above shortcomings in related art by providing a circuit structure capable of efficiently demodulating an FSK signal in a wireless charging device.

In order to achieve the above object, the circuit structure for efficiently demodulating an FSK signal in a wireless charging device of the present disclosure will be described as follows.

The main feature of the circuit structure for efficiently demodulating an FSK signal in a wireless charging device is that it mainly includes:

- a data sampling module configured to receive raw data from a coil, smooth the raw data, and sample period points in the raw data;
- a period point counting module configured to calculate a sum of the period points, the period point counting module having an input terminal connected to an output terminal of the data sampling module;
- a data distribution module configured to generate left channel data and right channel data, the left channel data being the sum of the period points, the right channel data being a difference value between the sum of the period points and a variable, and the data distribution module having an input terminal connected to an output terminal of the period point counting module; and
- a period point processing module configured to smooth the left channel data and the right channel data, perform data bit determination and output a demodulated FSK signal, the period point processing module having an input terminal connected to an output terminal of the data distribution module.

By means of the circuit structure for efficiently demodulating an FSK signal in a wireless charging device of the present disclosure, since the method described in the period point calculation module, left and right data generation module, and the period point processing module mentioned above is used in the demodulation circuit, efficient demodulation can be achieved by only using a 2M clock in data processing in the demodulation circuit. Even if an input signal is poor, demodulation can be performed accurately. The unpacking rate (the number of correct unpacking) is greatly improved. Meanwhile, since left and right processing flows are the same, the circuit is a time-division multiplexing circuit. Thus, the circuit overhead is reduced, the demodulation of the FSK signal is more efficient, and the circuit structure can be widely applied.

DESCRIPTION OF EMBODIMENTS

Figure 1:
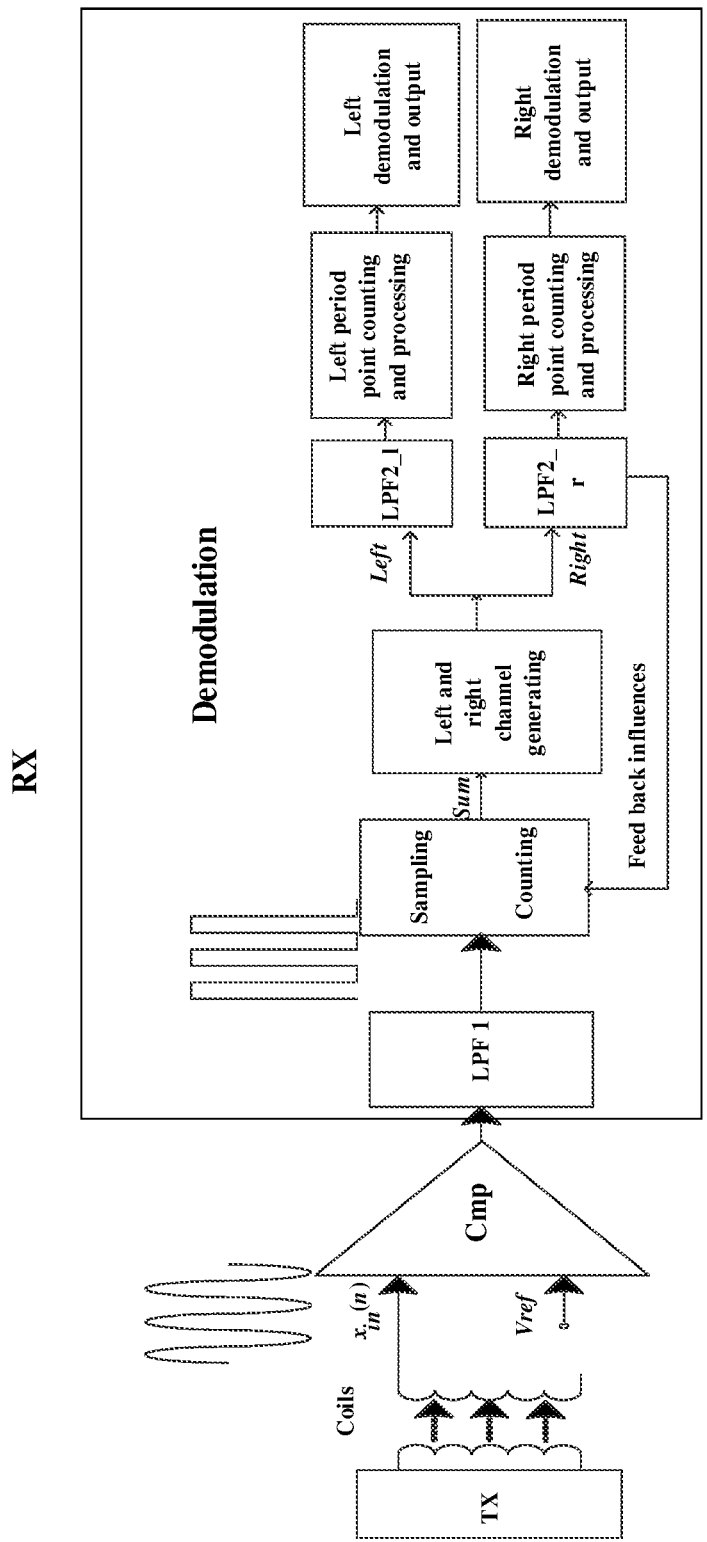
FIG. 1 is a schematic diagram of a circuit structure for efficiently demodulating an FSK signal in a wireless charging device according to the present disclosure.

In order to more clearly describe the technical content of the present disclosure, further description will be made below in conjunction with specific embodiments.

In a feasible implementation manner, a circuit structure for efficiently demodulating an FSK signal in a wireless charging device includes:
- a data sampling module configured to receive raw data from a coil, smooth the raw data, and sample period points in the raw data;
- a period point counting module configured to calculate a sum of the period points, the period point counting module having an input terminal connected to an output terminal of the data sampling module;
- a data distribution module configured to generate left channel data and right channel data, the left channel data being the sum of the period points, the right channel data being a difference value between the sum of the period points and a variable, and the data distribution module having an input terminal connected to an output terminal of the period point counting module; and
- a period point processing module configured to smooth the left channel data and the right channel data, perform data bit determination and output a demodulated FSK signal, the period point processing module having an input terminal connected to an output terminal of the data distribution module.

In a preferred embodiment, the data sampling module includes:
- a receiving coil for receiving signals from a transmitter;
- a receiving coil configured to receive signals from a transmitter;
- a first comparator configured to receive raw data from the receiving coil and compare the raw data with a reference potential, the raw data of the receiving coil being input to a first input terminal of the first comparator, a second input terminal of the first comparator being connected to the reference potential;
- a first low-pass filter configured to smooth data, the first low-pass filter including an input terminal connected to an output terminal of the first comparator and an output terminal for transmitting filtered data to a high frequency sampling unit; and
- the high frequency sampling unit configured to detect and sample the period points based on a rising edge, a signal outputted by the first low-pass filter being input to an input terminal of the high frequency sampling unit after being sampled at a frequency of 2 MHz, and an output terminal of the high frequency sampling unit being connected to the input terminal of the period point counting module.

In a further preferred embodiment, the first low-pass filter is a second-order IIR low-pass filter with a cutoff frequency of 5 kHz and a sampling frequency of 2 MHz.

In a preferred embodiment, the period point counting module includes a first selector, a first adder and a second adder, a first input terminal of the first selector is connected to an output terminal of the first adder, and a second input terminal of the first selector is connected to an output terminal of the second adder; the first adder is configured to calculate, when a number of times the data sampling module outputs data is greater than 256, a sum of all data outputted by the data sampling module; the second adder is configured to calculate, when the number of times the data sampling module outputs data is smaller than or equal to 256, a sum of all data outputted by the data sampling module; and an output terminal of the first selector selectively outputs an output result of the first adder or an output result of the second adder based on an input signal of an enabling terminal of the first selector.

In a preferred embodiment, the data distribution module includes a fourth D flip-flop, a fifth D flip-flop, a fifth selector, a sixth selector, an eighth comparator and a fifth adder, an input terminal of the fourth D flip-flop is connected to a flag signal, an output terminal of the fourth D flip-flop is connected to an enabling terminal of the fifth selector, a first input terminal of the fifth selector is connected to an output terminal of the eighth comparator, a second input terminal of the fifth selector is connected to an output terminal of the fifth adder, an output terminal of the fifth selector is connected to a second input terminal of the sixth selector, a first input terminal of the sixth selector is connected to a second threshold signal, an enabling terminal of the sixth selector is connected to an output terminal of the fifth D flip-flop, an input terminal of the fifth D is connected to a rising edge signal of an input signal, an output terminal of the sixth selector is respectively connected to a second input terminal of the eighth comparator and a second input terminal of the fifth adder, a first input terminal of the eighth comparator is connected to a first threshold signal, and a first input terminal of the fifth adder is connected to Logic 1.

In a preferred embodiment, the period point processing module includes:
- a second low-pass filter configured to smooth the left channel data and the right channel data, the left channel data and the right channel data being input to an input terminal of the second low-pass filter, a first output terminal of the second low-pass filter outputting the smoothed left channel data and a second output terminal of the second low-pass filter outputting the smoothed right channel data, and the first output terminal and the second output terminal of the second low-pass filter being connected to a feedback terminal of the period point counting module;
- a carrier frequency Fop unit configured to eliminate influence of Fop on a sum value of the period points, the carrier frequency Fop unit including an input terminal connected to a first output terminal and a second output terminal of the second low-pass filter, and an output terminal of the carrier frequency Fop unit outputting a difference value between two sums of period points;
- a frequency jitter-elimination unit configured to eliminate jitter and offset in the sum value of the period points such that only a period change value is left in the data, the output terminal of the carrier frequency Fop unit being connected to an input terminal of the frequency jitter-elimination unit; and
- a waveform modification unit configured to modify an outputted waveform within a certain numerical range, the output terminal of the carrier frequency Fop unit being connected to an input terminal of the waveform modification unit, an output terminal of the frequency jitter-elimination unit being connected to a control terminal of the waveform modification unit, and an output terminal of the waveform modification unit being an output terminal of the circuit structure.

In a further preferred embodiment, the second low-pass filter is a second-order IIR low-pass filter with a cutoff frequency of 5 kHz and a sampling frequency of 210 kHz.

In a further preferred embodiment, the carrier frequency Fop unit includes a first subtractor, a second subtractor, a first D flip-flop, a second D flip-flop, a third D flip-flop, a first comparator, a second comparator, a fifth comparator, a sixth comparator, a seventh comparator, a third adder, a fourth adder, a second selector, a third selector, a first AND gate, a second AND gate, a shift register and a second absolute value obtaining subunit, the output terminals of the second low-pass filter are respectively connected to a first input terminal of the first subtractor and an input terminal of the first D flip-flop, an output terminal of the first D flip-flop is connected to a second input terminal of the first subtractor, an output terminal of the first subtractor is connected to a first input terminal of the first comparator, a second input terminal of the first comparator is connected to a Logic signal 0, an output terminal of the first comparator is connected to an enabling terminal of the third adder, an output terminal of the third adder is connected to a first input terminal of the second selector, a second input terminal of the second selector is connected to Logic 0, an output terminal of the second selector is respectively connected to an input terminal of the third adder and a first input terminal of the second comparator, a first enabling signal terminal of the second selector is connected to an output terminal of the first AND gate, a second enabling terminal of the second selector is connected to a rising edge signal of an input signal, a third enabling terminal of the second selector is connected to an enabling signal of the circuit structure, a fourth enabling terminal of the second selector is connected to a reset signal of the circuit structure, and a fifth enabling terminal of the second selector is connected to a clock signal of the circuit structure; a second input terminal of the second comparator is connected to a fifth threshold signal, an output terminal of the second comparator is connected to a first input terminal of the first AND gate, a second input terminal of the first AND gate is connected to the rising edge signal of the input signal, the output terminal of the first AND gate is also connected to a first enabling terminal of the second D flip-flop, an input terminal of the second D flip-flop is connected to the output terminals of the second low-pass filter, an output terminal of the second D flip-flop is connected to a second input terminal of the second subtractor, a first input terminal of the second subtractor is connected to the output terminal of the second low-pass filter, a clock terminal of the second subtractor is connected to the rising edge signal of the input signal, an output terminal of the second subtractor is respectively connected to the input terminal of the frequency jitter-elimination unit, the input terminal of the waveform modification unit, and an input terminal of the second absolute value obtaining subunit, an output terminal of the second absolute value obtaining subunit is connected to a first input terminal of the fifth comparator, a second input terminal of the fifth comparator is connected to a third threshold signal, an output terminal of the fifth comparator is connected to a first input terminal of the second AND gate, and an output terminal of the second AND gate is connected to a second enabling terminal of the second D flip-flop; the output terminal of the second low-pass filter is also connected to the shift register, a clock terminal of the shift register is connected to the rising edge signal of the input signal, an output terminal of the shift register is connected to a first input terminal of the sixth comparator and an input terminal of the third D flip-flop, an output terminal of the third D flip-flop is connected to a second input terminal of the sixth comparator, an output terminal of the sixth comparator is connected to an enabling terminal of the fourth adder, a clock terminal of the fourth adder is connected to the rising edge signal of the input signal, an output terminal of the fourth adder is connected to a first input terminal of the third selector, an output terminal of the third selector is connected to an input terminal of the fourth adder and a first input terminal of the seventh comparator, a second input terminal of the third selector is connected to Logic 0, a second input terminal of the seventh comparator is connected to a sixth threshold signal, an output terminal of the seventh comparator is connected to a second input terminal of the second AND gate, a third input terminal of the second AND gate is connected to the rising edge signal of the input signal, the output terminal of the second AND gate is also connected to a first enabling terminal of the third selector, a second enabling terminal of the third selector is connected to the enabling signal of the circuit structure, a third enabling terminal of the third selector is connected to the reset signal of the circuit structure, and a fourth enabling terminal of the third selector is connected to the output terminal of the first AND gate; a fifth enabling terminal of the third selector is connected to the rising edge signal of the input signal, and a sixth enabling terminal of the third selector is connected to the clock signal of the circuit structure.

In a further embodiment, the frequency jitter-elimination unit includes a first absolute value obtaining subunit, a third comparator and a fourth comparator, an output terminal of the second subtractor is connected to an input terminal of the first absolute value obtaining sub-unit, an output terminal of the first absolute value obtaining subunit is respectively connected to a first input terminal of the third comparator and a second input terminal of the fourth comparator, a second input terminal of the third comparator is connected to a fourth threshold signal, a first input terminal of the fourth comparator is connected to the third threshold signal, and an output terminal of the third comparator and an output terminal of the fourth comparator are both connected to the control terminal of the waveform modification unit.

In a further embodiment, the waveform modification unit is the fourth selector, a first enabling signal terminal of a fourth selector is connected to the output terminal of the third comparator, a second enabling signal terminal of the fourth selector is connected to an output terminal of the fourth comparator, a first input terminal of the fourth selector is connected to the output terminal of the second subtractor, a second input terminal of the fourth selector is connected to Logic 1, a third input terminal of the fourth selector is connected to a second threshold signal, and an output terminal of the fourth selector is an output terminal of the circuit structure.

In a more specific embodiment, the entire process of FSK communication is shown in FIG. 1. In order to achieve that jitter of the waveform of an input signal will not affect the subsequent decoding algorithm, after a signal on a coil enters a chip and passes through a comparator, a value output by the comparator is read at a frequency of 2 MHz, and this value can be regarded as 1 bit sampling data of 2 MHz. The data first passes through a low-pass filter 1 such that the jitter waveform with a higher frequency is filtered out, and then, the period point counting is performed, and values of 256 sampling points are added up. The data stream is divided into a left channel and a right channel after passing through the left and right channel generation module, and then the data is respectively smoothed by the low-pass filter 2. Finally, data bit determination is performed on the output of the low-pass filter, so that 0 or 1 is outputted. It is worth noting that the processing subjected by the left and right outputs are completely the same, so the circuit is time-division multiplexing.

1) Low-Pass Filter 1

Figure 2:
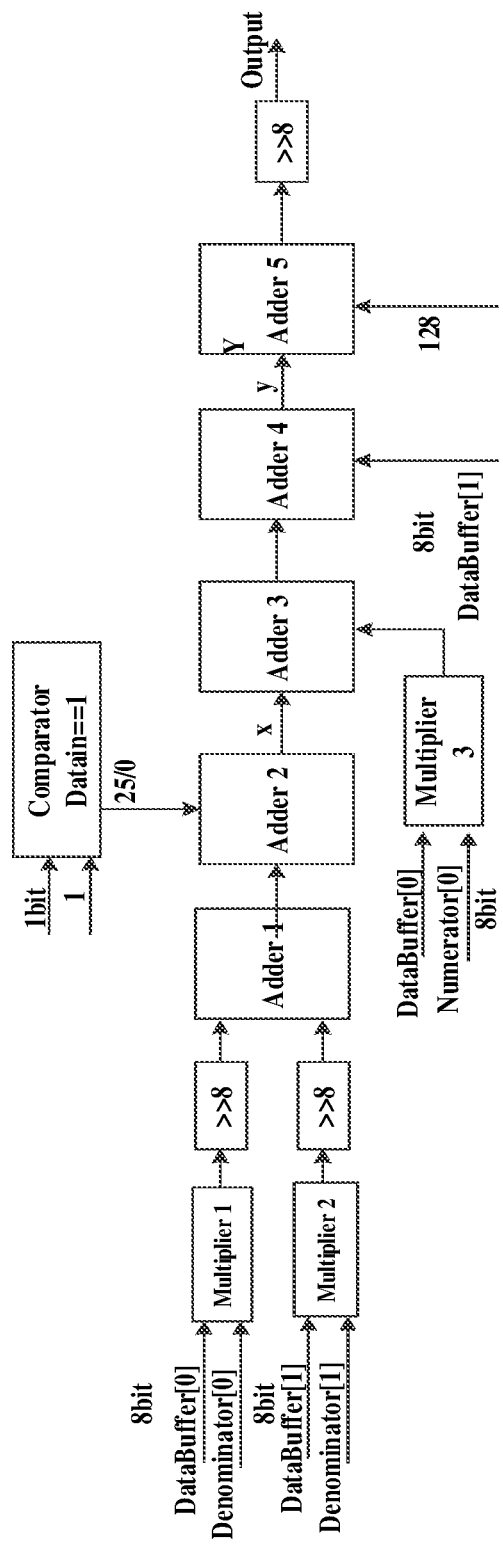
FIG. 2 is a circuit diagram of a first low-pass filter of a circuit structure for efficiently demodulating an FSK signal in a wireless charging device according to the present disclosure.

As shown in FIG. 2, in order to smooth the curve output by the comparator so as to exclude an amplitude abrupt point in an original signal, a second-order IIR low-pass filter LPF1 is used for processing. This filter includes 6 coefficients, which need to be processed with 8 bit fix-point and optimized accordingly.

In this calculation, there are three 8×8 multiplication operations, five 8+8 addition operations, three filter coefficients to be stored, and two 8 bit intermediate variable storage buffers.

2) High Frequency Sampling and Counting Part

Figure 3:
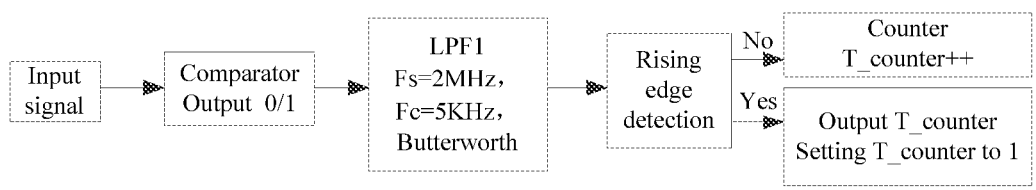
FIG. 3 is a structural schematic diagram of a high frequency sampling unit of a circuit structure for efficiently demodulating an FSK signal in a wireless charging device according to the present disclosure.

The counter T_counter is used to calculate the number of the data output by the filter LPF1. Once the output of the filter LPF1 changes from 0 to 1, one rising edge will appear, and the value of the counter T_counter is output and re-assigned to 1. In this system, the counter T_counter will always count at a fixed frequency of 2 MHz, and its length is 5 bit. Since 2 MHz/110 KHz=18.2, this value is smaller than 32. Moreover, it is unnecessary for this counter to take overflow processing into account. Because once T_counter overflows, it means that the following two cases may occur: 1) there is no signal on the coil for a long time; and 2) the period of the signal on the coil is too long. In both cases above, the chip should be in an abnormal working state, and the entire process of sampling and counting is as shown in FIG. 3.

3) Left and Right Channel Generating Part

Figure 4:
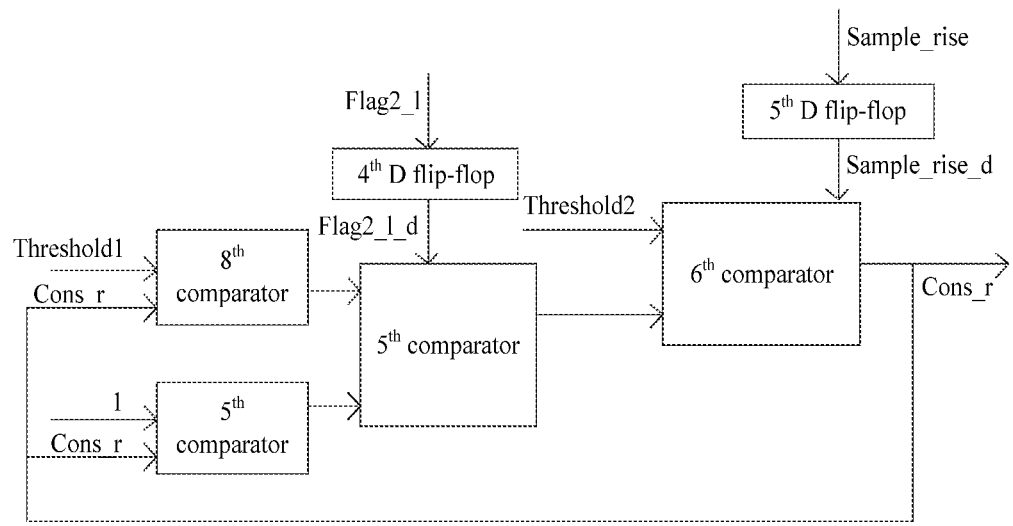
FIG. 4 is a structural schematic diagram of a data distribution module of a circuit structure for efficiently demodulating an FSK signal in a wireless charging device according to the present disclosure.

The output of the period point counting module passes through the left channel and right channel generation module such that the data stream is divided into left and right channels, in which, the left channel signal is a sum of 256 period counts, and the right channel data is obtained by subtracting a variable cons_r from the SUM of the 256 period counts under certain conditions, while the calculation process of the above variable is as shown in FIG. 4.

4) Calculation of Period Points

Figure 5:
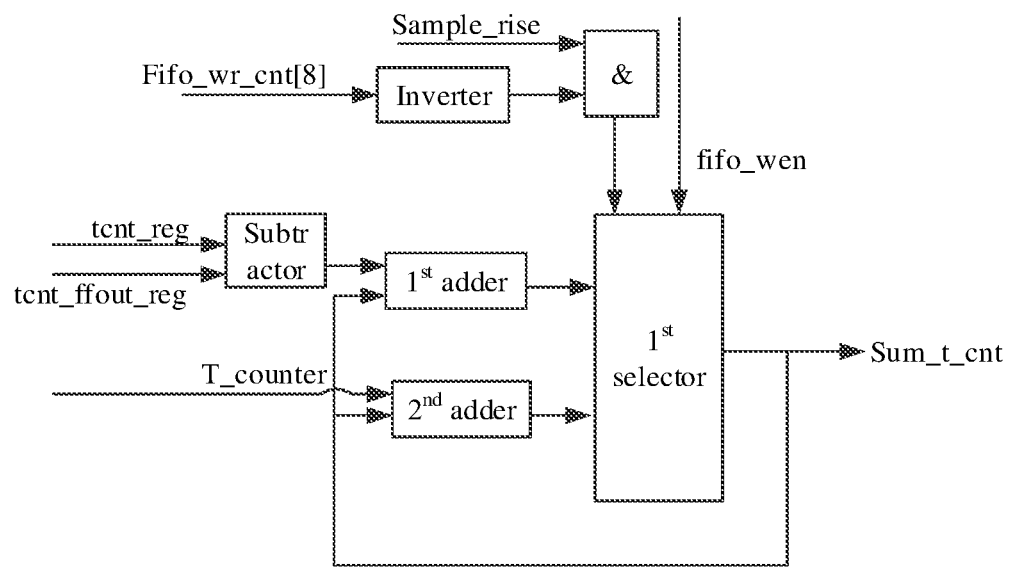
FIG. 5 is a circuit diagram of a period point counting module of a circuit structure for efficiently demodulating an FSK signal in a wireless charging device according to the present disclosure.

The calculation of the period points and the updating process are shown in FIG. 5. If there is an output from the counter T_counter, the sun of points of the most recent 256 periods is calculated first, and then this outputted value is stored in the period count buffer. After that, a sum of buffer members—SumTbuff—is calculated with 256 as a window, and then subsequently processing is performed on SumTbuff. The synchronous FIFO is used here to control writing and reading of T_counter. When the starting data is less than 256, T_counter is accumulated and written into the FIFO. When the number of T_counter is greater than 256, the first data in the FIFO is read out and subtracted in SumTbuff before data is written.

5) Low-Pass Filter 2

Figure 6:
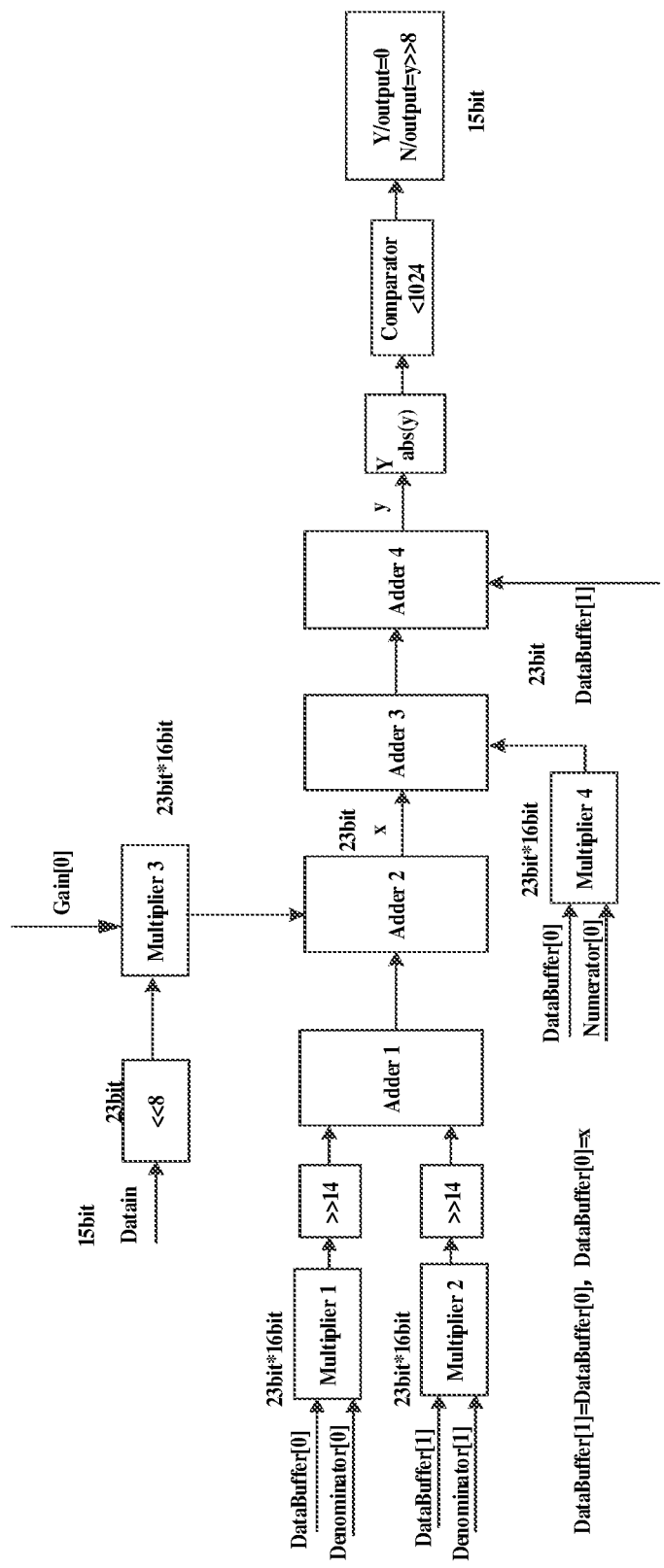
FIG. 6 is a circuit diagram of a second low-pass filter of a circuit structure for efficiently demodulating an FSK signal in a wireless charging device according to the present disclosure.

As shown in FIG. 6, the purpose of this filter is to smooth the outputted data, and the updating frequency of the input data thereof is Fop or Fmod, while the filter is designed when the maximum value is 205 KHz. A second-order IIR low-pass filter is used, and the coefficients are processed with 16 bit fix-point and optimized accordingly.

In the implementation of the filter, the input signal is first left shifted by 8 bits so as to be expanded into a 23 bit signal. In the specific operation process, there are four 23×16 multiplication operations, four 23+23 addition operations, four filter coefficients to be stored, and two 23 bit intermediate variable storage buffers.

6) Period Point Processing

Figure 7:
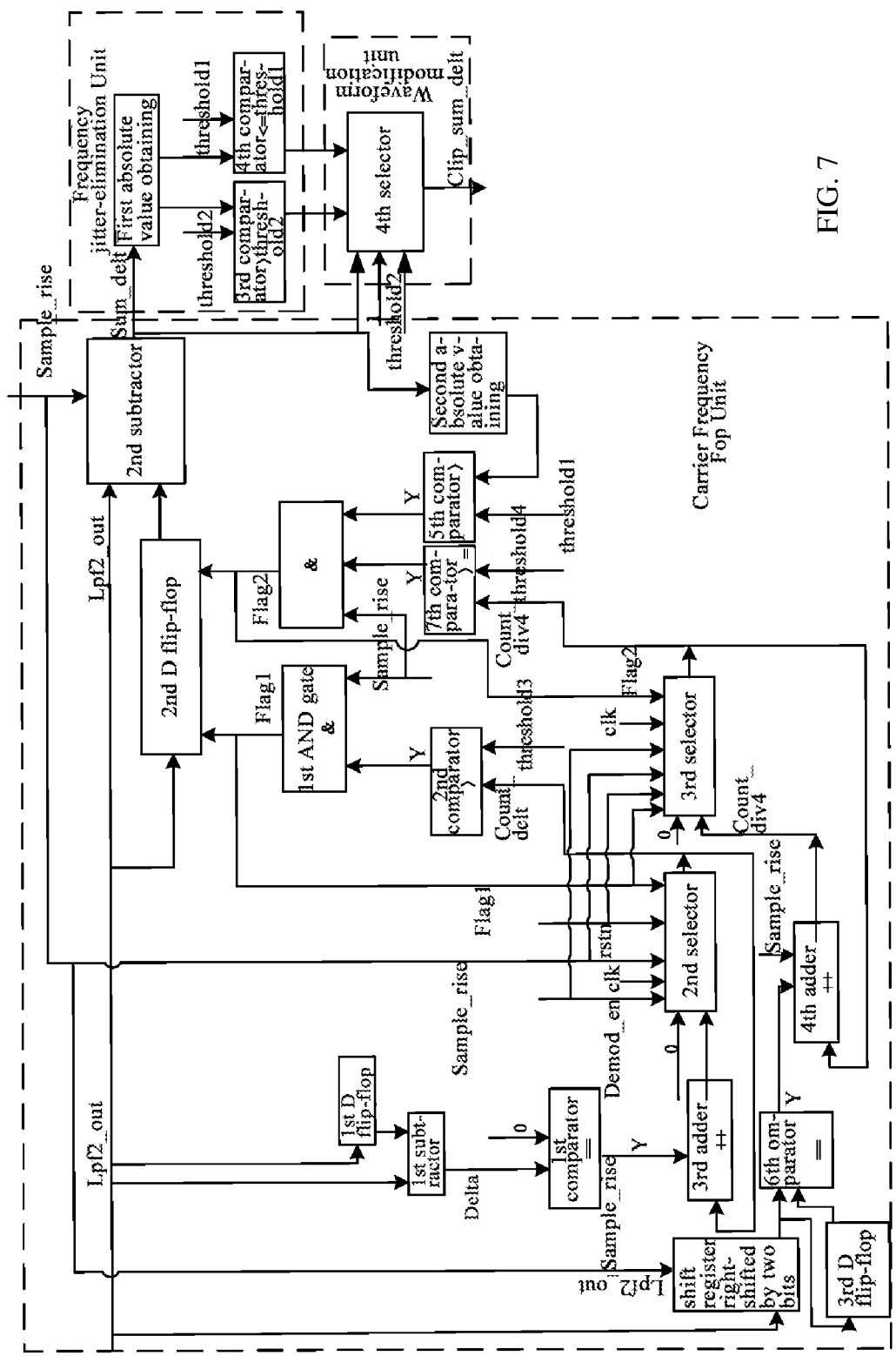
FIG. 7 is a circuit diagram of a period point processing module of a circuit structure for efficiently demodulating an FSK signal in a wireless charging device according to the present disclosure.

As shown in FIG. 7, with regarding to the circuit structure corresponding to the period point processing module, the LPF2_out signal is output after the SumTbuff passes through the low-pass filter 2, and since the SumTbuff will have a certain fluctuation during the communication, this fluctuation can be regarded as noise at a higher frequency. LPF2_out can reflect the change of frequency, and the value of Fop is determined at this time. Then, this value is used to make a difference with the value output by LPF2. At the same time, the differenced signal is subjected to a series of waveform modification processing, thereby eliminating jitter and offset in the sum value in such a manner that only the change value left so as to perform the determination. This module is mainly to complete detection of the frequency change, same frequency counting, and elimination of Fop influence on decoding and elimination of jitter.

As can be seen from FIG. 7, all calculations are performed at the time when a rising edge is detected. When flag signals flag1 and flag2 satisfy a condition, the LPF2_out will be buffered into one buffer via a D flip-flop and wait for a difference operation with the LPF2_out at the next moment. After the sum_delt is obtained, threshold protection is executed. When an absolute value of the sum_delt is smaller than a threshold threshold1, clip_sum_delt is 1, and when the absolute value of sum_delt is greater than the threshold threshold 4, clip_sum_delt is threshold4, otherwise clip_sum_delt is an absolute value of sum_delt. The condition under which the flag signal flag1 is 1 is that count_delt is greater than a threshold threshold5 when a rising edge arrives. The condition under which the flag signal flag2 is 1 is that count_div4 is greater than or equal to a threshold threshold 6 and the absolute value of sum_delt is greater than a threshold threshold3 when a rising edge arrives.

With the circuit structure for efficiently demodulating an FSK signal in a wireless charging device of the present disclosure, since the method described in the period point calculation module, left and right channel data generation module, and the period point processing module mentioned above is used in the demodulation circuit, efficient demodulation can be implemented by a demodulation circuit using only 2M clock processing data. Even if an input signal is poor, demodulation can be performed accurately. The unpacking rate (a number of correct unpackings) is greatly improved. Meanwhile, left and right processing flows are the same, and the circuit is a time-division multiplexing circuit. Thus, the circuit overhead is reduced, FSK signal demodulation is more efficient, and the circuit structure can be widely applied.

In this specification, the disclosure has been described with reference to specific embodiments thereof. However, it will be apparent that various modifications and changes can be made without departing from the scope of the disclosure. Accordingly, the specification and drawings are to be regarded as illustrative rather than limiting.

What is claimed is:

1. A circuit structure for efficiently demodulating an FSK signal in a wireless charging device, wherein the circuit structure comprises:

a data sampling module configured to receive raw data from a coil, smooth the raw data, and sample period points in the raw data;

a period point counting module configured to calculate a sum of the period points, the period point counting module having an input terminal connected to an output terminal of the data sampling module;

a data distribution module configured to generate left channel data and right channel data, the left channel data being the sum of the period points, the right channel data being a difference value between the sum of the period points and a variable, and the data distribution module having an input terminal connected to an output terminal of the period point counting module; and a period point processing module configured to smooth the left channel data and the right channel data, perform data bit determination and output a demodulated FSK signal, the period point processing module having an input terminal connected to an output terminal of the data distribution module.

2. The circuit structure for efficiently demodulating an FSK signal in a wireless charging device according to claim 1, wherein the data sampling module comprises:
   a receiving coil configured to receive signals from a transmitter;
   a first comparator configured to receive the raw data from the receiving coil and compare the raw data with a reference potential, the raw data of the receiving coil being input to a first input terminal of the first comparator, a second input terminal of the first comparator being connected to the reference potential;
   a first low-pass filter configured to smooth data, the first low-pass filter comprising an input terminal connected to an output terminal of the first comparator and an output terminal for transmitting filtered data to a high frequency sampling unit; and
   the high frequency sampling unit configured to detect and sample the period points based on a rising edge, a signal outputted by the first low-pass filter being input to an input terminal of the high frequency sampling unit after being sampled at a frequency of 2 MHz, and an output terminal of the high frequency sampling unit being connected to the input terminal of the period point counting module.

3. The circuit structure for efficiently demodulating an FSK signal in a wireless charging device according to claim 2, wherein the first low-pass filter is a second-order IIR low-pass filter with a cutoff frequency of 5 kHz and a sampling frequency of 2 MHz.

4. The circuit structure for efficiently demodulating an FSK signal in a wireless charging device according to claim 1, wherein the period point counting module comprises a first selector, a first adder and a second adder, a first input terminal of the first selector is connected to an output terminal of the first adder, and a second input terminal of the first selector is connected to an output terminal of the second adder; the first adder is configured to calculate, when a number of times the data sampling module outputs data is greater than 256, a sum of all data outputted by the data sampling module; the second adder is configured to calculate, when the number of times the data sampling module outputs data is smaller than or equal to 256, a sum of all data outputted by the data sampling module; and an output terminal of the first selector selectively outputs an output result of the first adder or an output result of the second adder based on an input signal of an enabling terminal of the first selector.

5. The circuit structure for efficiently demodulating an FSK signal in a wireless charging device according to claim 1, wherein the data distribution module comprises a fourth D flip-flop, a fifth D flip-flop, a fifth selector, a sixth selector, an eighth comparator and a fifth adder, an input terminal of the fourth D flip-flop is connected to a flag signal, an output terminal of the fourth D flip-flop is connected to an enabling terminal of the fifth selector, a first input terminal of the fifth selector is connected to an output terminal of the eighth comparator, a second input terminal of the fifth selector is connected to an output terminal of the fifth adder, an output terminal of the fifth selector is connected to a second input terminal of the sixth selector, a first input terminal of the sixth selector is connected to a second threshold signal, an enabling terminal of the sixth selector is connected to an output terminal of the fifth D flip-flop, an input terminal of the fifth D flip-flop is connected to a rising edge signal of an input signal, an output terminal of the sixth selector is respectively connected to a second input terminal of the eighth comparator and a second input terminal of the fifth adder, a first input terminal of the eighth comparator is connected to a first threshold signal, and a first input terminal of the fifth adder is connected to Logic 1.

6. The circuit structure for efficiently demodulating an FSK signal in a wireless charging device according to claim 1, wherein the period point processing module comprises:
   a second low-pass filter configured to smooth the left channel data and the right channel data, the left channel data and the right channel data being input to an input terminal of the second low-pass filter, a first output terminal of the second low-pass filter outputting the smoothed left channel data and a second output terminal of the second low-pass filter outputting the smoothed right channel data, and the first output terminal and the second output terminal of the second low-pass filter being connected to a feedback terminal of the period point counting module;
   a carrier frequency Fop unit configured to eliminate influence of Fop on a sum value of the period points, the carrier frequency Fop unit comprising an input terminal connected to a first output terminal and a second output terminal of the second low-pass filter, and an output terminal of the carrier frequency Fop unit outputting a difference value between two sums of period points;
   a frequency jitter-elimination unit configured to eliminate jitter and offset in the sum value of the period points such that only a period change value is left in the data, the output terminal of the carrier frequency Fop unit being connected to an input terminal of the frequency jitter-elimination unit; and
   a waveform modification unit configured to modify an outputted waveform within a certain numerical range, the output terminal of the carrier frequency Fop unit being connected to an input terminal of the waveform modification unit, an output terminal of the frequency jitter-elimination unit being connected to a control terminal of the waveform modification unit, and an output terminal of the waveform modification unit being an output terminal of the circuit structure.

7. The circuit structure for efficiently demodulating an FSK signal in a wireless charging device according to claim 6, wherein the second low-pass filter is a second-order IIR low-pass filter with a cutoff frequency of 5 kHz and a sampling frequency of 210 kHz.

8. The circuit structure for efficiently demodulating an FSK signal in a wireless charging device according to claim 6, wherein the carrier frequency Fop unit comprises a first subtractor, a second subtractor, a first D flip-flop, a second D flip-flop, a third D flip-flop, a first comparator, a second comparator, a fifth comparator, a sixth comparator, a seventh comparator, a third adder, a fourth adder, a second selector, a third selector, a first AND gate, a second AND gate, a shift register and a second absolute value obtaining subunit, the output terminals of the second low-pass filter are respectively connected to a first input terminal of the first subtractor and an input terminal of the first D flip-flop, an output terminal of the first D flip-flop is connected to a second input terminal of the first subtractor, an output terminal of the first subtractor is connected to a first input terminal of the first comparator, a second input terminal of the first comparator is connected to a Logic signal 0, an output terminal of the first comparator is connected to an enabling terminal of the third adder, an output terminal of the third adder is connected to a first input terminal of the second selector, a second input terminal of the second selector is connected to Logic 0, an output terminal of the second selector is respectively connected to an input terminal of the third adder and a first input terminal of the second comparator, a first enabling signal terminal of the second selector is connected to an output terminal of the first AND gate, a second enabling terminal of the second selector is connected to a rising edge signal of an input signal, a third enabling terminal of the second selector is connected to an enabling signal of the circuit structure, a fourth enabling terminal of the second selector is connected to a reset signal of the circuit structure, and a fifth enabling terminal of the second selector is connected to a clock signal of the circuit structure; a second input terminal of the second comparator is connected to a fifth threshold signal, an output terminal of the second comparator is connected to a first input terminal of the first AND gate, a second input terminal of the first AND gate is connected to the rising edge signal of the input signal, the output terminal of the first AND gate is also connected to a first enabling terminal of the second D flip-flop, an input terminal of the second D flip-flop is connected to the output terminals of the second low-pass filter, an output terminal of the second D flip-flop is connected to a second input terminal of the second subtractor, a first input terminal of the second subtractor is connected to the output terminal of the second low-pass filter, a clock terminal of the second subtractor is connected to the rising edge signal of the input signal, an output terminal of the second subtractor is respectively connected to the input terminal of the frequency jitter-elimination unit, the input terminal of the waveform modification unit, and an input terminal of the second absolute value obtaining subunit, an output terminal of the second absolute value obtaining subunit is connected to a first input terminal of the fifth comparator, a second input terminal of the fifth comparator is connected to a third threshold signal, an output terminal of the fifth comparator is connected to a first input terminal of the second AND gate, and an output terminal of the second AND gate is connected to a second enabling terminal of the second D flip-flop; the output terminal of the second low-pass filter is also connected to the shift register, a clock terminal of the shift register is connected to the rising edge signal of the input signal, an output terminal of the shift register is connected to a first input terminal of the sixth comparator and an input terminal of the third D flip-flop, an output terminal of the third D flip-flop is connected to a second input terminal of the sixth comparator, an output terminal of the sixth comparator is connected to an enabling terminal of the fourth adder, a clock terminal of the fourth adder is connected to the rising edge signal of the input signal, an output terminal of the fourth adder is connected to a first input terminal of the third selector, an output terminal of the third selector is connected to an input terminal of the fourth adder and a first input terminal of the seventh comparator, a second input terminal of the third selector is connected to Logic 0, a second input terminal of the seventh comparator is connected to a sixth threshold signal, an output terminal of the seventh comparator is connected to a second input terminal of the second AND gate, a third input terminal of the second AND gate is connected to the rising edge signal of the input signal, the output terminal of the second AND gate is also connected to a first enabling terminal of the third selector, a second enabling terminal of the third selector is connected to the enabling signal of the circuit structure, a third enabling terminal of the third selector is connected to the reset signal of the circuit structure, and a fourth enabling terminal of the third selector is connected to the output terminal of the first AND gate; a fifth enabling terminal of the third selector is connected to the rising edge signal of the input signal, and a sixth enabling terminal of the third selector is connected to the clock signal of the circuit structure.

9. The circuit structure for efficiently demodulating an FSK signal in a wireless charging device according to claim 8, wherein the frequency jitter-elimination unit comprises a first absolute value obtaining subunit, a third comparator and a fourth comparator, an output terminal of the second subtractor is connected to an input terminal of the first absolute value obtaining sub-unit, an output terminal of the first absolute value obtaining subunit is respectively connected to a first input terminal of the third comparator and a first input terminal of the fourth comparator, a second input terminal of the third comparator is connected to a fourth threshold signal, a second input terminal of the fourth comparator.

10. The circuit structure for efficiently demodulating an FSK signal in a wireless charging device according to claim 9, wherein the waveform modification unit is the fourth selector, a first enabling signal terminal of a fourth selector is connected to the output terminal of the third comparator, a second enabling signal terminal of the fourth selector is connected to an output terminal of the fourth comparator, a first input terminal of the fourth selector is connected to the output terminal of the second subtractor, a second input terminal of the fourth selector is connected to Logic 1, a third input terminal of the fourth selector is connected to a second threshold signal, and an output terminal of the fourth selector is an output terminal of the circuit structure.

* * * * *